US008655993B1

(12) United States Patent
Mixter

(10) Patent No.: US 8,655,993 B1
(45) Date of Patent: Feb. 18, 2014

(54) CONFIGURING NETWORKS IN CLIENT COMPUTING DEVICES

(75) Inventor: Kenneth Edward Mixter, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/269,528

(22) Filed: Oct. 7, 2011

(51) Int. Cl.
 *G06F 15/177* (2006.01)
(52) U.S. Cl.
 USPC .......................... 709/221; 709/220; 709/222
(58) Field of Classification Search
 USPC ............... 709/220–223; 726/2, 3, 5; 713/161, 713/170, 176
 See application file for complete search history.

(56) References Cited

U.S. PATENT DOCUMENTS

| 7,373,661 | B2* | 5/2008 | Smith et al. | 726/15 |
| 7,409,709 | B2* | 8/2008 | Smith et al. | 726/15 |
| 7,711,947 | B2* | 5/2010 | Smith et al. | 713/100 |
| 7,730,302 | B2* | 6/2010 | Palekar et al. | 713/165 |
| 7,809,949 | B2* | 10/2010 | Wysocki et al. | 713/180 |

* cited by examiner

*Primary Examiner* — Umar Cheema
(74) *Attorney, Agent, or Firm* — McDermott Will & Emery LLP

(57) ABSTRACT

Systems and methods for configuring network settings in a client computing device are provided. In some aspects, a method includes receiving a network configuration file including network settings for connecting to one or more networks and a signature. The method also includes authenticating the network configuration file based on the signature. The method also includes updating a network configuration of the client computing device with the network settings from the authenticated network configuration file.

18 Claims, 5 Drawing Sheets

CONFIGURING NETWORKS IN CLIENT COMPUTING DEVICES

BACKGROUND

The subject technology generally relates to configuring networks in client computing devices.

Many client computing devices, including laptop computers, desktop computers, mobile phones, tablet computers, and personal digital assistants (PDAs) may connect to enterprise or home networks. Oftentimes, configuring networks on a client computing device involves much work, where an end-user of the client computing device and a network administrator need to both be near the device, such that the administrator may ensure that the device is properly configured and the end-user may enter the login credentials. Thus, if multiple devices for multiple end-users need to be configured, the network administrator may need to coordinate with the multiple end-users and spend a lot of his/her own time. Removing a client computing device from a network or changing the networks that a client computing device may access, for example during a network upgrade, similarly requires a difficult process.

SUMMARY

In one innovative aspect, the disclosed subject matter can be embodied in a method that includes receiving a network configuration file including network settings for connecting to one or more networks and a signature. The method also includes authenticating the network configuration file based on the signature. The method also includes updating a network configuration of the client computing device with the network settings from the authenticated network configuration file.

These and other embodiments can include one or more of the following features. The network configuration file may include a new network configuration for the one or more networks. The network configuration file may include a change to the network configuration of the client computing device for at least one of the one or more networks. The network configuration file may include an indication that a network configuration of the client computing device for at least one of the one or more networks is to be deleted. The network configuration file may include a unique identifier identifying at least one of the one or more networks. The network configuration file may not include any instructions regarding updating the network configuration of the client computing device. The network configuration of the client computing device may be configured to be unmodifiable or uncopyable by an end-user of the client computing device. The method may also include determining that the network configuration file is available. Determining that the network configuration file is available may include sending a request for the network configuration file and receiving a response that the network configuration file is available. The request for the network configuration file may be sent upon detecting a new network. The request for the network configuration file may be sent upon determining that no request for the network configuration file has been sent within a time period. The network configuration file may include a certificate for connecting to at least one of the one or more networks. The network configuration file may be associated with a virtual private network (VPN), and the network configuration of the client computing device may include an identifier for a VPN type or an identifier for a VPN host. The network configuration file may be associated with a WiFi network. The network configuration of the client computing device may include one or more of a service set identifier (SSID), a network password, an autoconnect setting, a security setting or an extensible authentication protocol (EAP) object. The network configuration file may include at least first network settings for a first user and a second network settings for a second user.

In one innovative aspect, the disclosed subject matter can be embodied in a non-transitory computer-readable medium that includes instructions. The instructions include code for receiving a network configuration file including network settings for connecting to a network. The instructions also include code for authenticating the network configuration file. The instructions also include code for updating a network configuration of the computer with the network settings from the authenticated network configuration file.

In one innovative aspect, the disclosed subject matter can be embodied in a method that includes receiving at least one identifier associated with at least one client computing device and network settings for connecting to one or more networks. The method also includes generating a network configuration file including the network settings and a signature for authenticating the network configuration file. The method also includes transmitting the network configuration file to at least one client computing device.

These and other embodiments can include one or more of the following features. Transmitting the network configuration file to at least one client computing device may include pushing the network configuration file to at least one client computing device. At least one identifier may be associated with an end-user. The end-user may be associated with at least one client computing device.

In one innovative aspect, the disclosed subject matter can be embodied in a system. The system includes a receiver configured to receive a network configuration file including network settings for connecting to one or more networks. The system also includes a signature verification engine configured to authenticate the network configuration file based on a signature associated with the network configuration file. The system also include a network configuration update engine configured to update a network configuration of the computer for the one or more networks with the network settings from the authenticated network configuration file.

These and other embodiments can include one or more of the following features. One or more of the signature verification engine or the network configuration update engine may be implemented in software.

Advantageously, aspects of the subject technology provide, among other things, techniques for automatically configuring networks on multiple client computing devices that require less involvement by network administrators or end-users. As a result, efficiency may be increased as network administrators and end-users save time and effort.

Various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to techniques for configuring network settings in a client computing device. One technique involves receiving a network configuration file including network settings for connecting to one or more networks and a signature. The signature may be associated with a trusted server machine. The network settings may involve adding a new network to the client computing device or modifying or removing an existing network on the client computing device. The networks impacted by the network configuration file may be identified by unique identifiers. The technique may include authenticating the network configuration file based on the signature. After authenticating the network configuration file, the technique may involve updating a network configuration of the client computing device with the network settings from the authenticated network configuration file.

Figure 1:
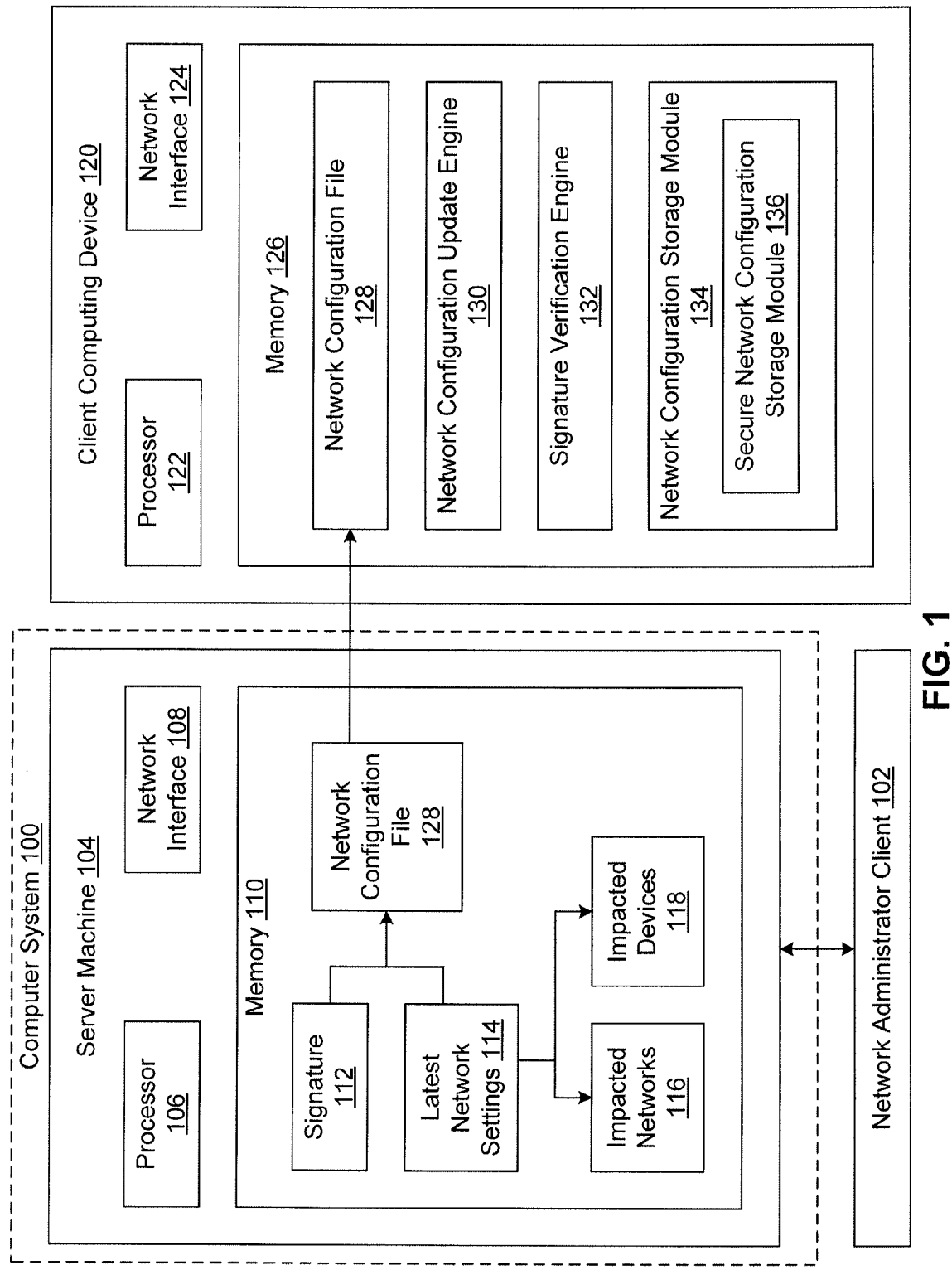
FIG. 1 illustrates an example of a computer system configured to implement configuring networks in client computing devices.

FIG. 1 illustrates an example of a computer system 100 configured to implement configuring networks in client computing devices. As shown, the computer system 100 includes a server machine 104. The server machine 104 may be configured to communicate with a network administrator client 102 and a client computing device 102 over a network. While only one network administrator client 102, server machine 104, and client computing device 120 are illustrated, the subject technology may be implemented with one or more network administrator client 102, server machine 104, and client computing device 120.

As shown, the server machine 104 includes a processor 106, a network interface 108, and a memory 110. The processor 106 is configured to execute computer instructions that are stored in a computer-readable medium, for example, the memory 110. The processor may be a central processing unit (CPU). The network interface 108 is configured to allow the server machine 104 to transmit and receive data in a network, for example, the Internet, an intranet, a local area network or a cellular network. The network interface 108 may include a transmitter and a receiver. The network interface 108 may include one or more network interface cards (NICs). The memory 110 stores data and instructions. As illustrated, the memory 110 stores a signature 112, "latest network settings" 114, impacted networks 116 impacted devices 118 associated with the "latest network settings" 114, and a "network configuration file" 128.

The "latest network settings" 114 include network settings for client computing devices 120. The latest network settings 114 may identify one or more impacted networks 116 and one or more impacted devices 118 that are modified by the latest network settings 114. The latest network settings 114 may include an addition of one or more impacted networks 116 to one or more impacted devices 118, a change to a configuration of one or more impacted networks 116 on one or more of the impacted devices 118 or an indication that one or more impacted networks 116 on one or more of the impacted devices 118 is to be deleted. The indication that one or more impacted networks 116 is to be deleted may include marking the network settings associated with the networks to be deleted as null, void, blank or a similar indicator. One example impacted network may be a virtual private network (VPN), and the latest network settings may include an identifier for a VPN type or an identifier for a VPN host. Another example impacted network may be a WiFi network, and the latest network settings may include one or more of a service set identifier (SSID), a network password, an autoconnect setting, a security setting, or an extensible authentication protocol (EAP) object. For impacted devices having multiple users where one user is logged in, the latest network settings 114 may be transmitted only for the user who is logged in. The latest network settings 114 for the other users may be transmitted when the other users log in.

The signature 112 may be generated by the server machine 104. The signature 112 may be used to authenticate data transmitted from the server machine 104 as being from the server machine 104 or another trusted source. In one example, all or a portion of the latest network settings 114 may be combined with the signature 112 to create a network configuration file 128 for one or more devices, e.g., client computing device 120, in the set of impacted devices 118. The network configuration file may be transmitted to the one or more devices in the set of impacted devices 118. In one aspect, each device in the impacted devices 118 may receive its own network configuration file 128 including network settings for the device that need to be updated, added or deleted.

The "network configuration file" 128 includes a network configuration based on the latest network settings 114 in the server machine 104 that may be installed on the client computing device 120. The "network configuration file" 128 may be transmitted to client computing device 120 and is described in more detail below in conjunction with the client computing device 120 and in conjunction with FIG. 2.

The network administrator client 102 may be any computing device capable of displaying content, for example, via a web browser or via a specialized application. The network administrator client 102 may be a laptop computer, a desktop computer, a mobile phone, a personal digital assistant (PDA), a tablet computer, a netbook, a physical machine or a virtual machine. Persons skilled in the art will recognize other devices that could implement the functionalities of the network administrator client 102.

The network administrator client 102 may be operated by a network administrator who decides which network settings may be transmitted to which client computing devices. In one example, the network administrator client 102 may be configured to allow the network administrator to enter the latest network settings 114, the impacted networks 116, and the impacted devices 118 to be stored in the memory 110 of the server machine 104. In response to receiving the latest network settings 114, impacted networks 116, and impacted devices 118 from the network administrator client 102, the server machine 104 may generate one or more network configuration files 128 based on the latest network settings 114 to transmit to one or more devices, e.g., client computing devices 120, in the set of impacted devices 118.

The client computing device 120 may be any computing device capable of displaying content, for example, via a web browser or via a specialized application. The client computing device 120 may be a laptop computer, a desktop computer, a mobile phone, a personal digital assistant (PDA), a tablet computer, a netbook, a physical machine or a virtual machine. Persons skilled in the art will recognize other devices that could implement the functionalities of the client computing device 120.

As shown, the client computing device 120 includes a processor 122, a network interface 124, and a memory 126. The processor 122 is configured to execute computer instructions that are stored in a computer-readable medium, for example, the memory 126. The processor may be a central processing unit (CPU). The network interface 124 is configured to allow the client computing device 120 to transmit and receive data in a network, for example, the Internet, an intranet, a local area network or a cellular network. The network interface 124 may include a transmitter and a receiver. The network interface 124 may include one or more network interface cards (NICs). The memory 126 stores data and instructions. As illustrated, the memory 126 stores a "network configuration file" 128, a "network configuration update engine" 130, a "signature verification engine" 132, and a "network configuration storage module" 134.

The "network configuration file" 128 includes a network configuration based on the latest network settings 114 in the server machine 104 that may be installed on the client computing device 120. The "network configuration file" 128 may cause the client computing device 120 to add a new network configuration, delete an existing network configuration, or modify an existing network configuration for one or more impacted networks 116. The existing network configuration may be identified by a unique identifier for the impacted network, for example, a global unique identifier (GUID) may identify the impacted network. The network configuration may allow the client computing device 120 to connect to a network, while the network settings include values that allow devices to connect to networks. The network configuration file 128 may also include a signature 112 to verify its authenticity. The network configuration file 128 may come from the server machine 104 and include the signature 112 generated by the server machine 104.

The network configuration file 128 may be associated with one or more networks and may cause the configurations associated with the one or more networks to be added, deleted or modified on the client computing device 120. The network configuration file 128 may not include any instructions regarding updating the network configuration of the client computing device 120. Rather, the instructions for updating the network configuration based on the network configuration file 128 may be stored on the client computing device 120, for example, in the "network configuration update engine" 130.

The "network configuration update engine" 130 is configured to receive the network configuration file 128 including the latest network settings 114 for one or more impacted networks 116. After receiving the network configuration file 128, the network configuration update engine 132 stores the latest network settings 114 for the impacted networks 116 in the "network configuration storage module" 134. The instructions for receiving and processing a network configuration file 128 may be stored in the "network configuration update engine" 130 and may not be included in the network configuration file 128.

The "signature verification engine" 132 is configured to verify that a signature 112 in a network configuration file 128 is a valid signature associated with the server machine 104 or another trusted source. The client computing device 120 may be configured to update network settings stored in the "network configuration storage module" 134 based on the network configuration file 128 only if the signature 112 in the network configuration file is verified by the signature verification engine 132.

The "network configuration storage module" 134 is configured to store network configurations for the client computing device 120 that allow the client computing device 120 to connect to one or more networks. In one implementation, the client computing device 120 may be configured to have multiple user accounts. Each user account may be associated with a unique, encrypted "network configuration storage module" 134 associated with the account of the user. As a result, a user having an account may not be able to view or access networks that are associated with the accounts of other users, but the user may be able to view and access networks that are associated with his/her own account. In addition, some networks may be accessible to all users of the client computing device 120. For such networks, the "network configuration storage module" 134 may store system-wide network settings that are identical in each user account. Each user account may have its own copy of the system-wide network settings. Alternatively, a single system-wide network settings file may be shared by all of the users of the client computing device 120.

As illustrated, the "network configuration storage module" 134 includes a "secure network configuration storage module" 136. Network settings or network configurations that are based on a network configuration file 128 received from a server machine 104 may be stored in the "secure network configuration storage module" 136. Data saved in the secure network configuration storage module 136, including the network settings from the network configuration file, may be unmodifiable or uncopyable by an end-user of the client computing device 120.

Figure 2:
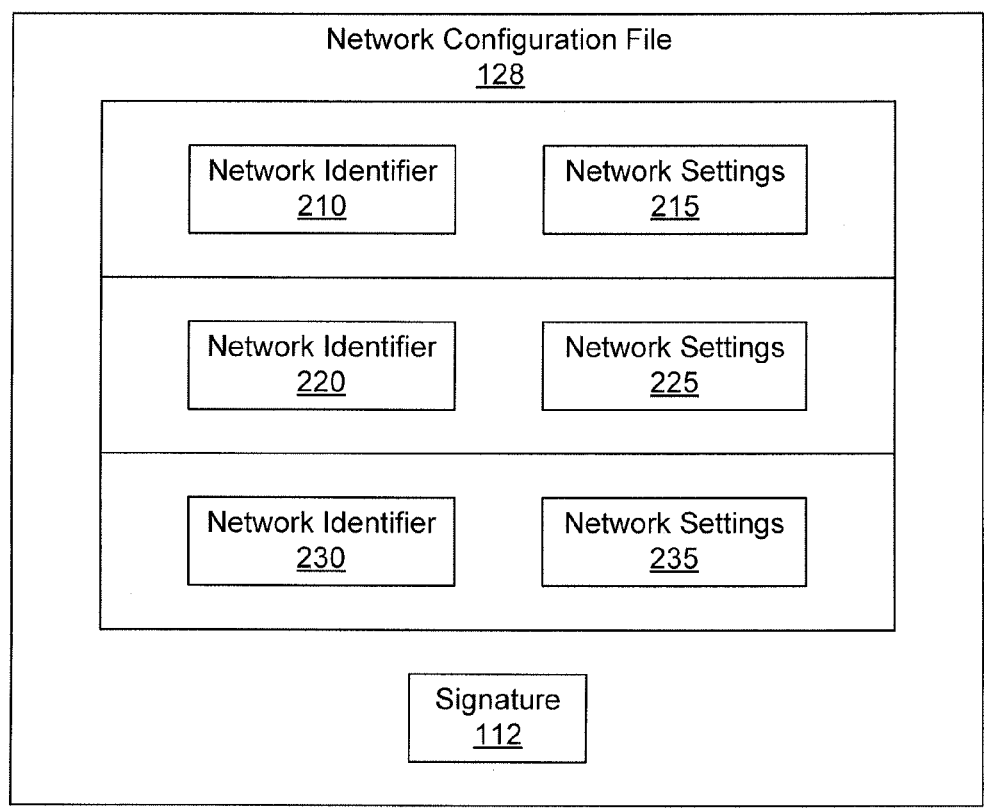
FIG. 2 illustrates an example of the network configuration file of FIG. 1 in more detail.

FIG. 2 illustrates an example of the network configuration file 128 of FIG. 1 in more detail. As shown, the network configuration file 128 includes a signature 112 generated by the server machine 104 and one or more network identifiers 210, 220, and 230. The network identifiers 210, 220, and 230 may uniquely identify one or more of the networks impacted by the latest network settings 114 that are associated with the client computing device 120. In one example, the network identifiers 210, 220, and 230 may be global unique identifiers (GUIDs) identifying the networks associated with the network identifiers.

The network settings 215 include settings for network identified by network identifier 210 based on which a configuration for the network identified by the network identifier 210 may be generated. For example, the network settings 215 may include a certificate. Alternatively, the network identified by network identifier 210 may be a virtual private network (VPN). The network settings 215 may include a VPN type or a VPN host. In another example, the network identifier 210 may identify a WiFi network, and network settings 215 may include one or more of a service set identifier (SSID), a network password, an autoconnect setting, a security setting or an extensible authentication protocol (EAP) object. In one aspect, the client computing device 120 may have multiple users and a network identifier 220 for a network may be associated with settings 225 for the user who is currently logged in. The network settings for the remaining users may be updated when the remaining users log in. In one implementation, the settings associated with one network may be blank or null or may otherwise indicate that the network should be deleted from the client computing device 120. Network identifier 230 may be associated with network settings 235, similarly to network identifier 210.

As illustrated, the network configuration file 128 includes configurations for three different networks. However, the subject technology may be implemented with network configuration files that include configurations for any number of networks. Specifically, the network configuration file may include configurations for more than three networks or less than three networks. Furthermore, the network configuration file 128 includes network settings 215, 225, and 235 but may not include any instructions regarding how to install the settings. The instructions may be stored in the memory 126 of the client computing device 120, for example, in the network configuration update engine 130. In one aspect, the network configuration file 128 includes network identifiers and network settings. However, the network configuration file may further include additional data.

Figure 3:
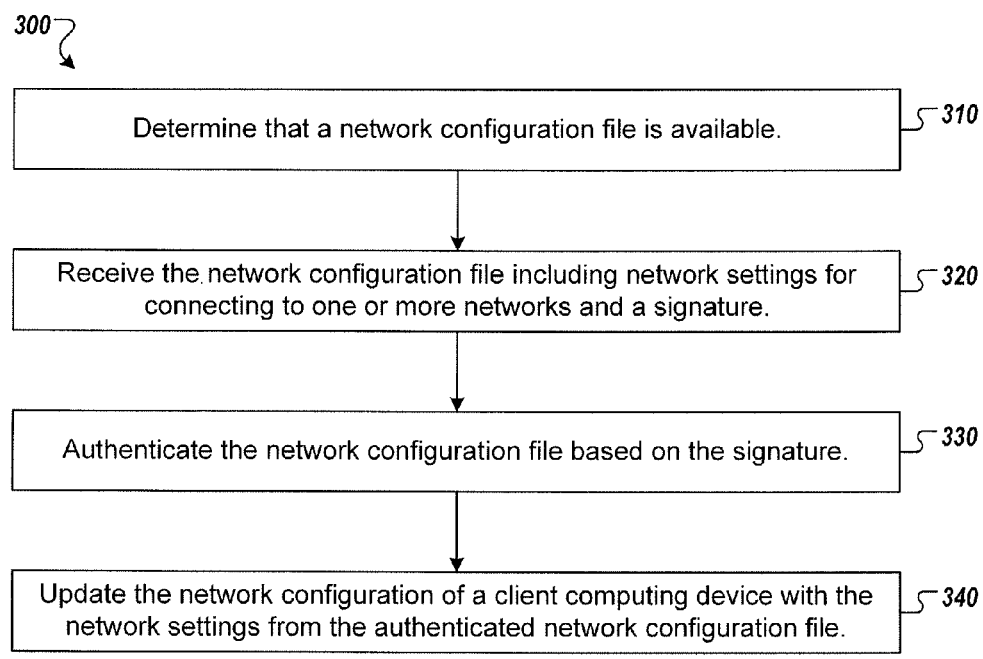
FIG. 3 illustrates an example process by which a network may be configured on a client computing device.

FIG. 3 illustrates an example process 300 by which a network may be configured on a client computing device 120.

The process 300 begins at step 310 where the client computing device 120 determines that a network configuration file 128 is available. The client computing device 120 may determine that a network configuration file 128 is available by sending to the server machine 104 a request for the network configuration file 128 upon detecting a new network and receiving a response that the network configuration file 128 is available. If the client computing device 120 include multiple users, the request for the network configuration file 128 may be associated with one of the users of the client computing device 120. The client computing device 120 may then pull the network configuration file 128 from the server machine 104. In one implementation, the client computing device may not be able to connect to the new network while executing step 310. Thus, the request for the network configuration file 128 may be sent to the server machine 104 over a network different from the new network. For example, the new network may be a WiFi network and the request for the network configuration file 128 may be sent from the client computing device 120 to the server machine 104 over a cellular network. In one implementation, the client computing device 120 may send the request for the network configuration file 128 upon determining that no request for the network configuration file has been sent within a time period. The client computing device 120 may receive a response that the network configuration file 128 is available. The client computing device 120 may then pull the network configuration file 128 from the server machine 104.

At step 320, the client computing device 120 receives the network configuration file 128 from the server machine 104. The network configuration file 128 may include network settings for connecting to one or more networks and a signature 112. The network configuration file 112 may be generated on the server machine 104 based on the signature 112 and the latest network settings 114 stored on the server machine 104.

At step 330, the client computing device 120 authenticates the network configuration file 128 based on the signature 112 in the network configuration file 128. The signature 112 may be associated with the server machine 104 or another trusted source.

At step 340, the client computing device 120 updates the network configuration of the client computing device 120 with the network settings from the authenticated network configuration file 128. The client computing device 120 may then connect to a network associated with the network settings. It should be noted that if the client computing device 120 includes multiple user accounts, the authenticated network configuration file 128 may update network settings only for the user account that is logged into the client computing device 120 when the authenticated network configuration file 128 is received. After step 340, the process 300 ends.

Figure 4:
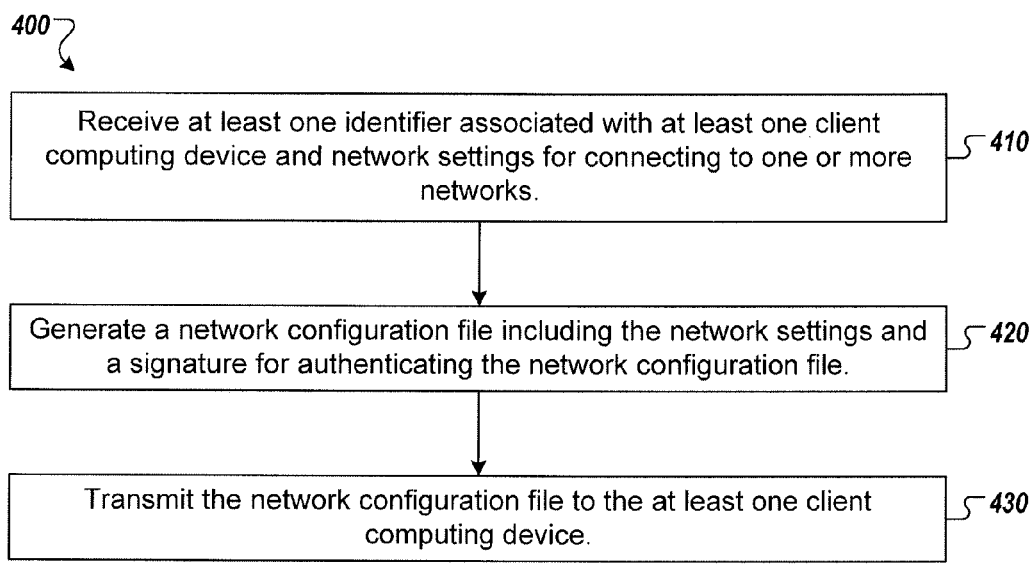
FIG. 4 illustrates an example process by which a network configuration may be transmitted to a client computing device.

FIG. 4 illustrates an example process 400 by which a network configuration may be transmitted to a client computing device.

The process 400 begins at step 410 where the server machine 104 receives at least one identifier associated with at least one client computing device and network settings for connecting to one or more networks. The identifier and the network settings may be received from the network administrator client 102. In one aspect, at least one identifier may be an identifier associated with an end-user, and the end-user may be associated with the one or more client computing devices. In one implementation, a user of the network administrator client 102, e.g., a network administrator, may be presented with an interface that presents a set of devices or users associated with devices and a set of networks. The administrator may select one or more networks or devices on which to modify the network configurations and input the modified network settings.

According to step 420, the server machine 104 generates a network configuration file 128 including the received network settings and a signature 112 for authenticating the network configuration file 128. The network configuration file 128 may be generated based on data received from the network administrator client 102.

According to step 430, the server machine 104 transmits the network configuration file 128 to at least one client computing device associated with the identifier. The server machine 104 may push the network configuration file to the client computing device. After step 430, the process 400 ends.

Figure 5:
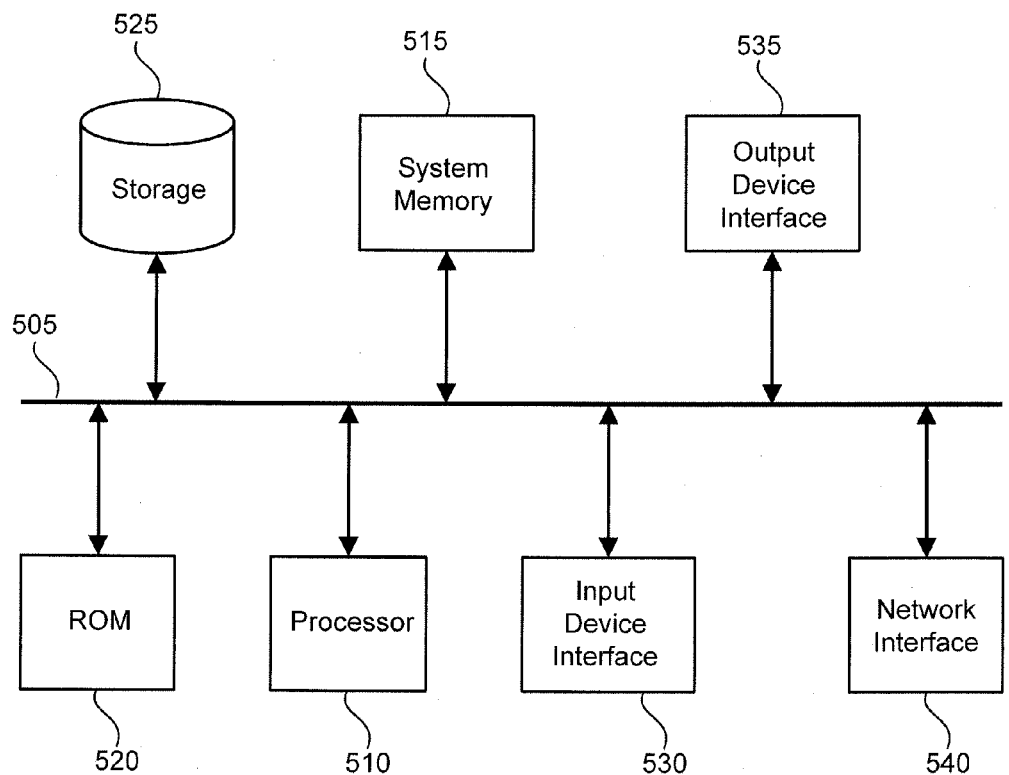
FIG. 5 conceptually illustrates an example electronic system with which some implementations of the subject technology are implemented.

FIG. 5 conceptually illustrates an electronic system 500 with which some implementations of the subject technology are implemented. For example, one or more of the network administrator client 102, the server machine 104, or the client computing device 120 may be implemented using the arrangement of the electronic system 500. The electronic system 500 can be a computer (e.g., a mobile phone, PDA), or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, an input device interface 530, an output device interface 535, and a network interface 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some implementations of the subject technology use a mass-storage device (for example a magnetic or optical disk and its corresponding disk drive) as the permanent storage device 525.

Other implementations use a removable storage device (for example a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the processes of the subject technology are stored in the system memory 515, the permanent storage device 525, or the read-only memory 520. For example, the various memory units include instructions for configuring networks in client computing devices in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, for example cathode ray tubes (CRT) or liquid crystal displays (LCD). Some implementations include devices for example a touchscreen that functions as both input and output devices.

Finally, as shown in FIG. 5, bus 505 also couples electronic system 500 to a network (not shown) through a network interface 540. In this manner, the electronic system 500 can be a part of a network of computers (for example a local area network ("LAN"), a wide area network ("WAN"), or an Intranet, or a network of networks, for example the Internet. Any or all components of electronic system 500 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

What is claimed is:

1. A computer-implemented method for configuring network settings in a client computing device, the method comprising:
    receiving a network configuration file comprising network settings for connecting to one or more networks and a signature, wherein the network settings comprise first settings for a first network for generating a first configuration for the first network, wherein, within the network configuration file, the first network is identified by a first network identifier;
    authenticating the network configuration file based on the signature; and
    updating a network configuration of the client computing device for the first network identified by the first network identifier with the network settings from the authenticated network configuration file, wherein the network configuration file does not include instructions regarding updating the network configuration of the client computing device, wherein at least a portion of the network configuration of the client computing device is stored within a secure network configuration storage module, and wherein the secure network configuration storage module is incapable of being modified or incapable of being copied by an end-user of the client computing device and is updatable with the network settings from the authenticated network configuration file.

2. The method of claim 1, wherein the network configuration file comprises a new network configuration for the one or more networks.

3. The method of claim 1, wherein the network configuration file comprises a change to the network configuration of the client computing device for the at least one of the one or more networks.

4. The method of claim 1, wherein the network configuration file comprises an indication that a network configuration of the client computing device for the at least one of the one or more networks is to be deleted.

5. The method of claim 1, wherein the network configuration file comprises a unique identifier identifying at least one of the one or more networks.

6. The method of claim 1, further comprising determining that the network configuration file is available.

7. The method of claim 6, wherein determining that the network configuration file is available comprises:

sending a request for the network configuration file; and
receiving a response that the network configuration file is available.

8. The method of claim 7, wherein the request for the network configuration file is sent upon detecting a new network.

9. The method of claim 7, wherein the request for the network configuration file is sent upon determining that no request for the network configuration file has been sent within a time period.

10. The method of claim 1, wherein the network configuration file comprises a certificate for connecting to at least one of the one or more networks.

11. The method of claim 1, wherein the network configuration file is associated with a virtual private network (VPN), wherein the network configuration of the client computing device comprises an identifier for a VPN type or an identifier for a VPN host.

12. The method of claim 1, wherein the network configuration file is associated with a WiFi network, wherein the network configuration of the client computing device comprises one or more of a service set identifier (SSID), a network password, an autoconnect setting, a security setting or an extensible authentication protocol (EAP) object.

13. A non-transitory computer-readable medium for configuring network settings in a client computing device, the computer-readable medium comprising instructions that, when executed by a computer, cause the computer to:
receive a network configuration file comprising network settings for connecting to a network, wherein the network settings comprise first settings for a first network for generating a first configuration for the first network, wherein, within the network configuration file, the first network is identified by a first network identifier;
authenticate the network configuration file; and
update a network configuration of the computer for the first network identified by the first network identifier with the network settings from the authenticated network configuration file, wherein the network configuration file does not include instructions regarding updating the network configuration of the client computing device, wherein at least a portion of the network configuration of the client computing device is stored within a secure network configuration storage module, and wherein the secure network configuration storage module is incapable of being modified or incapable of being copied by an end-user of the client computing device and is updatable with the network settings from the authenticated network configuration file.

14. A computer-implemented method for providing network settings to a client computing device, the method comprising:
receiving at least one identifier associated with at least one client computing device and network settings for connecting to one or more networks, wherein the network settings comprise first settings for a first network for generating a first configuration for the first network;
generating a network configuration file comprising the network settings and a signature for authenticating the network configuration file, wherein, within the network configuration file, the first network is identified by a first network identifier; and
transmitting the network configuration file to the at least one client computing device, wherein the network configuration file does not include instructions regarding updating a network configuration of the at least one client computing device, wherein at least a portion of the network configuration of the at least one client computing device is stored within a secure network configuration storage module of the at least one client computing device, and wherein the secure network configuration storage module is incapable of being modified or incapable of being copied by an end-user of the at least one client computing device and is updatable with the network settings from the authenticated network configuration file.

15. The method of claim 14, wherein transmitting the network configuration file to the at least one client computing device comprises pushing the network configuration file to the at least one client computing device.

16. The method of claim 14, wherein the at least one identifier is associated with an end-user, wherein the end-user is associated with the at least one client computing device.

17. A system comprising:
a receiver configured to receive a network configuration file comprising network settings for connecting to one or more networks, wherein the network settings comprise first settings for a first network for generating a first configuration for the first network, wherein, within the network configuration file, the first network is identified by a first network identifier;
a signature verification engine configured to authenticate the network configuration file based on a signature associated with the network configuration file; and
a network configuration update engine configured to update a network configuration of a computer for the one or more networks with the network settings from the authenticated network configuration file, wherein the network configuration file does not include instructions regarding updating the network configuration of the computer, wherein at least a portion of the network configuration of the computer is stored within a secure network configuration storage module, and wherein the secure network configuration storage module is incapable of being modified or incapable of being copied by an end-user of the computer and is updatable with the network settings from the authenticated network configuration file.

18. The system of claim 17, wherein one or more of the signature verification engine or the network configuration update engine is implemented in software.

* * * * *